US 7,697,151 B2

(12) United States Patent
Mongeon

(10) Patent No.: US 7,697,151 B2
(45) Date of Patent: Apr. 13, 2010

(54) IMAGE QUALITY CONTROL METHOD AND APPARATUS FOR MULTIPLE MARKING ENGINE SYSTEMS

(75) Inventor: Michael C. Mongeon, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 1161 days.

(21) Appl. No.: 11/090,502

(22) Filed: Mar. 25, 2005

(65) Prior Publication Data

US 2006/0215240 A1 Sep. 28, 2006

(51) Int. Cl.
G06K 15/00 (2006.01)
G06F 3/12 (2006.01)
B41J 2/435 (2006.01)

(52) U.S. Cl. .............. 358/1.14; 358/1.13; 347/264

(58) Field of Classification Search .......... 707/1, 707/103 R; 700/99, 97, 101; 358/1.13, 296, 358/1.12; 705/8; 399/14, 382, 403, 296, 399/49
See application file for complete search history.

(56) References Cited

U.S. PATENT DOCUMENTS

| 4,579,466 | A | 4/1986 | Sato |
| 4,587,532 | A | 5/1986 | Asano |
| 4,710,785 | A | 12/1987 | Mills |
| 4,836,119 | A | 6/1989 | Siraco |
| 5,080,340 | A | 1/1992 | Hacknauer |
| 5,095,342 | A | 3/1992 | Farrell |
| 5,159,395 | A | 10/1992 | Farrell |
| 5,208,640 | A | 5/1993 | Horie |
| 5,272,511 | A | 12/1993 | Conrad |
| 5,326,093 | A | 7/1994 | Sollitt |
| 5,389,969 | A | 2/1995 | Suzuki |
| 5,435,544 | A | 7/1995 | Mandel |
| 5,473,419 | A | 12/1995 | Russel |
| 5,504,568 | A | 4/1996 | Saraswat |
| 5,510,896 | A | 4/1996 | Wafler |
| 5,525,031 | A | 6/1996 | Fox |
| 5,557,367 | A | 9/1996 | Yang |
| 5,568,246 | A | 10/1996 | Keller |
| 5,570,172 | A | 10/1996 | Acquaviva |
| 5,596,416 | A | 1/1997 | Barry |
| 5,629,762 | A | 5/1997 | Mahoney |
| 5,710,968 | A | 1/1998 | Clark |
| 5,778,377 | A | 7/1998 | Marlin |
| 5,884,118 | A | 3/1999 | Mestha |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

Primary Examiner—King Y Poon
Assistant Examiner—Neil R McLean
(74) Attorney, Agent, or Firm—Fay Sharpe LLP

(57) ABSTRACT

A full width array CCD sensor is incorporated in the media path to monitor fused pages by calculating area coverage from multiple engines in a Tightly Integrated Parallel Process (TIPP) architecture. With knowledge of the area coverage differences between print engines for a given pixel count to the ROS, a relative density difference of each engine is determined. Based on the determined relative density difference, an adjustment is calculated and applied to the engine with the largest error to match the area coverage(s) of the other engine(s).

19 Claims, 5 Drawing Sheets

U.S. PATENT DOCUMENTS

| | | |
|---|---|---|
| 5,884,910 A | 3/1999 | Mandel |
| 5,995,721 A | 11/1999 | Rourke |
| 6,059,284 A | 5/2000 | Wolf |
| 6,125,248 A | 9/2000 | Moser |
| 6,241,242 B1 | 6/2001 | Munro |
| 6,297,886 B1 | 10/2001 | Cornell |
| 6,384,918 B1 | 5/2002 | Hubble, III |
| 6,418,281 B1 | 7/2002 | Ohki |
| 6,450,711 B1 | 9/2002 | Conrow |
| 6,476,376 B1 | 11/2002 | Biegelsen |
| 6,476,923 B1 | 11/2002 | Cornell |
| 6,493,098 B1 | 12/2002 | Cornell |
| 6,537,910 B1 | 3/2003 | Burke |
| 6,550,762 B2 | 4/2003 | Stoll |
| 6,554,276 B2 | 4/2003 | Jackson |
| 6,577,925 B1 | 6/2003 | Fromherz |
| 6,607,320 B2 | 8/2003 | Bobrow |
| 6,608,988 B2 | 8/2003 | Conrow |
| 6,612,566 B2 | 9/2003 | Stoll |
| 6,621,576 B2 | 9/2003 | Tandon |
| 6,633,382 B2 | 10/2003 | Hubble, III |
| 6,639,669 B2 | 10/2003 | Hubble, III |
| 6,819,906 B1 | 11/2004 | Herrmann |
| 7,310,108 B2 * | 12/2007 | Moore ........................ 347/264 |
| 7,433,062 B2 * | 10/2008 | Takahashi .................. 358/1.13 |
| 2002/0078012 A1 | 6/2002 | Ryan |
| 2002/0103559 A1 | 8/2002 | Gartstein |
| 2003/0077095 A1 | 4/2003 | Conrow |
| 2004/0085561 A1 | 5/2004 | Fromherz |
| 2004/0085562 A1 | 5/2004 | Fromherz |
| 2004/0088207 A1 | 5/2004 | Fromherz |
| 2004/0150156 A1 | 8/2004 | Fromherz |
| 2004/0150158 A1 | 8/2004 | Biegelsen |
| 2004/0153983 A1 | 8/2004 | McMillan |
| 2004/0216002 A1 | 10/2004 | Fromherz |
| 2004/0225391 A1 | 11/2004 | Fromherz |
| 2004/0225394 A1 | 11/2004 | Fromherz |

OTHER PUBLICATIONS

Desmond Fretz, "Cluster Printing Solution Announced", Today at Xerox (TAX), No. 1129, Aug. 3, 2001.

* cited by examiner

IMAGE QUALITY CONTROL METHOD AND APPARATUS FOR MULTIPLE MARKING ENGINE SYSTEMS

CROSS REFERENCE TO RELATED APPLICATIONS

The following applications, the disclosures of each being totally incorporated herein by reference are mentioned:

U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES," by David G. Anderson, et al.;

U.S. Provisional Application Ser. No. 60/631,656, filed Nov. 30, 2004, entitled "MULTI-PURPOSE MEDIA TRANSPORT HAVING INTEGRAL IMAGE QUALITY SENSING CAPABILITY," by Steven R. Moore;

U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," by David G. Anderson et al.;

U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE," by David G. Anderson et al.;

U.S. application Ser. No. 10/761,522, filed Jan. 21, 2004, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. application Ser. No. 10/860,195, filed Aug. 23, 2004, entitled "UNIVERSAL FLEXIBLE PLURAL PRINTER TO PLURAL FINISHER SHEET INTEGRATION SYSTEM," by Robert M. Lofthus, et al.;

U.S. application Ser. No. 10/881,619, filed Jun. 30, 2004, entitled "FLEXIBLE PAPER PATH USING MULTIDIRECTIONAL PATH MODULES," by Daniel G. Bobrow;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/917,768, filed Aug. 13, 2004, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. application Ser. No. 10/924,106, filed Aug. 23, 2004, for PRINTING SYSTEM WITH HORIZONTAL HIGHWAY AND SINGLE PASS DUPLEX by Lofthus, et al.;

U.S. application Ser. No. 10/924,113, filed Aug. 23, 2004, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004 for PRINT SEQUENCE SCHEDULING FOR RELIABILITY by Robert M. Lofthus, et al.;

U.S. patent application Ser. No. 10/924,459, filed Aug. 23, 2004, entitled "PARALLEL PRINTING ARCHITECTURE USING IMAGE MARKING DEVICE MODULES," by Barry P. Mandel, et al;

U.S. patent application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. patent application Ser. No. 10/999,450, filed Nov. 30, 2004, entitled "ADDRESSABLE FUSING FOR AN INTEGRATED PRINTING SYSTEM," by Robert M. Lofthus, et al.;

U.S. patent application Ser. No. 11/000,158, filed Nov. 30, 2004, entitled "GLOSSING SYSTEM FOR USE IN A TIPP ARCHITECTURE," by Bryan J. Roof;

U.S. patent application Ser. No. 11/000,168, filed Nov. 30, 2004, entitled "ADDRESSABLE FUSING AND HEATING METHODS AND APPARATUS," by David K. Biegelsen, et al.;

U.S. patent application Ser. No. 11/000,258, filed Nov. 30, 2004, entitled "GLOSSING SYSTEM FOR USE IN A TIPP ARCHITECTURE," by Bryan J. Roof;

U.S. application Ser. No. 11/001,890, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/002,528, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/051,817, filed Feb. 4, 2005, entitled "PRINTING SYSTEMS," by Steven R. Moore, et al.;

U.S. application Ser. No. 11/109,996, filed Feb. 28, 2004, entitled "PRINTING SYSTEMS," by Robert M. Lofthus, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.; and, U.S. application Ser. No. 11/081,473, filed Mar. 16, 2005, entitled "MULTI-PURPOSE MEDIA TRANSPORT HAVING INTEGRAL IMAGE QUALITY SENSING CAPABILITY," by Steven R. Moore.

BACKGROUND

The present exemplary embodiment relates to printing systems. It finds particular application in conjunction with adjusting image quality in print or marking systems with multiple electrophotographic or xerographic print engines. However, it is to be appreciated that the present exemplary embodiment is also amenable to other like applications.

Typically, in image rendering or printing systems, it is desirable that a rendered, or printed, image closely match, or have similar aspects or characteristics to a desired target or input image. However, many factors, such as temperature, humidity, ink or toner age, and/or component wear, tend to move the output of a printing system away from the ideal or target output. For example, in xerographic marking engines, system component tolerances and drifts, as well as environmental disturbances, may tend to move an engine response curve (ERC) away from an ideal, desired or target engine response and toward an engine response that yields images that are lighter or darker than desired.

In order to provide increased production speed, document processing systems that include a plurality of marking engines have been developed. In such systems, the importance of engine response control or stabilization is amplified. Subtle changes that may be unnoticed in the output of a single marking engine can be highlighted in the output of a multi-engine image rendering or marking system. For example, the facing pages of an opened booklet rendered or printed by a multi-engine printing system can be printed by different engines. For instance, the left-hand page in an open booklet may be printed by a first print engine while the right-hand page is printed by a second print engine. The first print engine may be printing images in a manner slightly darker than the ideal and well within a single engine tolerance; while the second print engine may be printing images in a manner slightly lighter than the ideal and also within the single engine tolerance. While an observer might not ever notice the subtle variations when reviewing the output of either engine alone, when the combined output is compiled and displayed adjacently, the variation in intensity from one print engine to another may become noticeable and be perceived as an issue of quality by a user.

One approach to improve consistency among multiple engines is for a user to periodically inspect the print quality. When inconsistency becomes noticeable, the user initiates printing of test patches on multiple engines and scans the test patches in. The scanner reads the test patches and adjusts the xerography of the engines to match. However, this approach requires a user intervention and the scanner to scan the test patches. Another approach to improve image consistency among multiple engines is to print test patches with the engines of the multiple engine system and compare the test patches against one another. However, such approach is complex as it involves substantial software development as well as elaborate scheduling of test patches to not interfere with the print job.

There is a need for methods and apparatuses that overcome the aforementioned problems and others.

REFERENCES

U.S. Pat. No. 4,710,785, which issued Dec. 1, 1987 to Mills, entitled PROCESS CONTROL FOR ELECTROSTATIC MACHINE, discusses an electrostatic machine having at least one adjustable process control parameter.

U.S. Pat. No. 5,510,896, which issued Apr. 23, 1996 to Wafler, entitled AUTOMATIC COPY QUALITY CORRECTION AND CALIBRATION, discloses a digital copier that includes an automatic copy quality correction and calibration method that corrects a first component of the copier using a known test original before attempting to correct other components that may be affected by the first component.

U.S. Pat. No. 5,884,118, which issued Mar. 16, 1999 to Mestha, entitled PRINTER HAVING PRINT OUTPUT LINKED TO SCANNER INPUT FOR AUTOMATIC IMAGE ADJUSTMENT, discloses an imaging machine having operating components including an input scanner for providing images on copy sheets and a copy sheet path connected to the input scanner.

U.S. Pat. No. 6,418,281, which issued Jul. 9, 2002 to Ohki, entitled IMAGE PROCESSING APPARATUS HAVING CALIBRATION FOR IMAGE EXPOSURE OUTPUT, discusses a method wherein a first calibration operation is preformed in which a predetermined grayscale pattern is formed on a recording paper and this pattern is read by a reading device to produce a LUT for controlling the laser output in accordance with the image signal (gamma correction).

However, the aforementioned Patents are not concerned with methods for improving or achieving image consistency between or among a plurality of marking engines.

BRIEF DESCRIPTION

In accordance with one aspect, an automatic method for controlling image consistency in an image rendering system that includes a plurality of marking engines is disclosed. A first sheet of a print job is printed on a first print media with the first marking engine. A second sheet of the print job is printed on a second print media with the second marking engine. Concurrently with the printing of the first and second sheets of the print job, a density inconsistency is determined at least between the first and second sheets of the print job. Based on the inconsistency determination, at least one parameter of at least one of the first and the second marking engine is adjusted to improve image consistency between at least the first and second marking engines.

In accordance with another aspect, a document processing system is disclosed. The document processing system includes two or more xerographic print engines for printing sheets of a print job, each xerographic print engine having at least one xerographic actuator. A sensor measures light reflected from each sheet of the print job printed with the print engines. An analyzer analyzes light measurements of the sheet with the sheets printed with different engines and determines an amount of adjustment of at least one parameter of the document processing system for the at least one of xerographic actuators. A xerographic actuator adjuster adjusts the at least one xerographic actuator according to the adjustment amount determined by the analyzer to substantially match the xerography of the engines.

DETAILED DESCRIPTION

Figure 1:
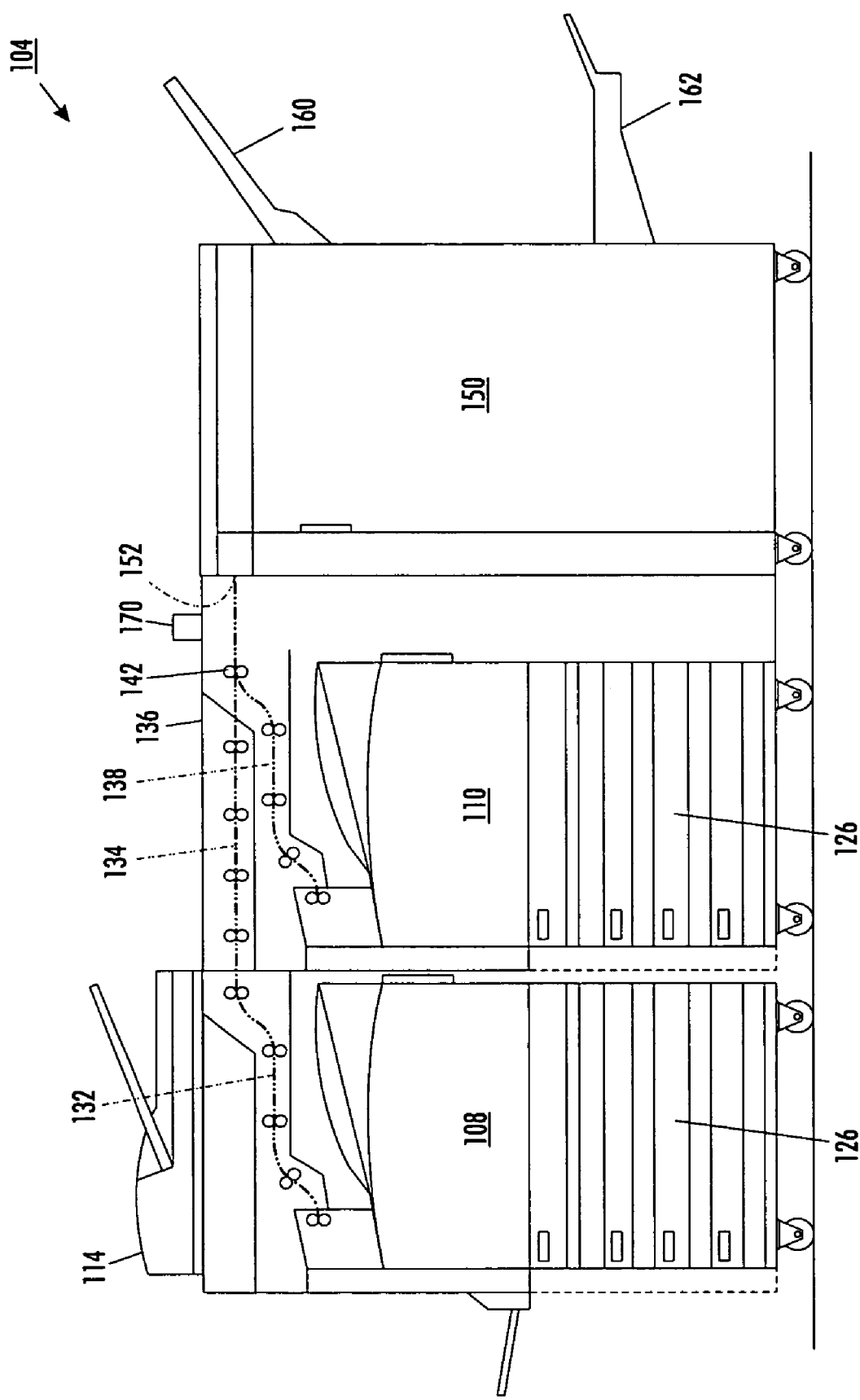
FIG. 1 is a view of an image or document processing system including a plurality of print engines.

With reference to FIG. 1, an image or document processing system 104, that might incorporate embodiments of the methods and systems disclosed herein, includes a first image output terminal (IOT) 108, a second image output terminal 110, and an image input device 114, such as a scanner, imaging camera or other device. Although only two output terminals are illustrated, it is contemplated that the document processing system can include a plurality of output terminals. Each image output terminal 108, 110 includes a plurality of input media trays 126 and an integrated marking engine as will be discussed in a greater detail below. The first image output terminal 108 may support the image input device 114 and includes a first portion 132 of a first output path. A second portion 134 of the first output path is provided by a bypass module 136. The second image output terminal 110 includes a first portion 138 of a second output path. A third portion of the first path and a second portion of the second path begin at a final nip 142 of the second image output terminal 110 and include an input to a finisher 150.

The finisher 150 includes, for example, first 160 and second 162 main job output trays. Depending on a document processing job description and on the capabilities of the finisher 150, one or both of the main job output trays 160, 162 may collect loose pages or sheets, stapled or otherwise bound booklets, shrink wrapped assemblies or otherwise finished documents. The finisher 150 receives sheets or pages from one or both of the image output terminals 108, 110 via an input 152 and processes the pages according to a job description associated with the pages or sheets and according to the capabilities of the finisher 150.

A controller (not shown) controls the production of printed or rendered pages, the transportation over the path elements 132, 134, 138, 148 and 152, and the collation and assembly as job output by the finisher 150. The produced, printed or rendered pages may include images transferred to the document processing system via a telephone communications network, a computer network, computer media, and/or images entered through the image input device 114. For example, rendered or printed pages or sheets may include images received via facsimile, transferred to the document processing system from a word processing, spreadsheet, presentation, photo editing or other image generating software, transferred to the document processor 104 over a computer network or on a computer media, such as a CD ROM, memory card or floppy disc, or may include images generated by the image input device 114 of scanned or photographed pages or objects. The images can be transferred, manually or automatically, to the image input device 114 to generate computer readable representations of the rendered images.

As discussed in a greater detail below, a full width CCD sensor 170, which is disposed about the path 142, 152, measures an amount of light reflected from each pixel of every line of images produced by the engines and converts the detected lightness information into digital numbers which can be read and analyzed by the controller, or some auxiliary device. For example, the information can contain a series of zeroes and ones, where "ones" represent the pixels for which LEDs were turned ON. The number of "ones" can be divided by total number of pixels in the image to measure output area coverage of each engine. The measured area coverages represent print densities of each printed page which are analyzed to measure relative engine density or lightness differences. The information about image lightness is accumulated overtime for each engine. By comparing the image lightness information of different engines, it can be determined whether an adjustment needs to be made. For example, relative lightness L*, as defined by the Commission Internationale de l'Eclairages (CIE) can be analyzed and compensated for. Relative lightness L* is typically calculated by comparing a background lightness to the lightness of print. Thus, if necessary, some aspect of the engine with the largest error is adjusted in a manner predetermined or known to make an improvement in, or achieve, image consistency from one engine to another. For example, electrophotographic, xerographic, or other rendering technology actuators may be adjusted. Integration of the sensor 170 within the media path of the multiple engines provides relative measurements between the engines. Such relative measurements loosen calorimetric tolerances that are typically in place when the measurements are absolute. This results in a low cost set up of the focus, illuminant uniformity and sensor SNR.

Figure 2:
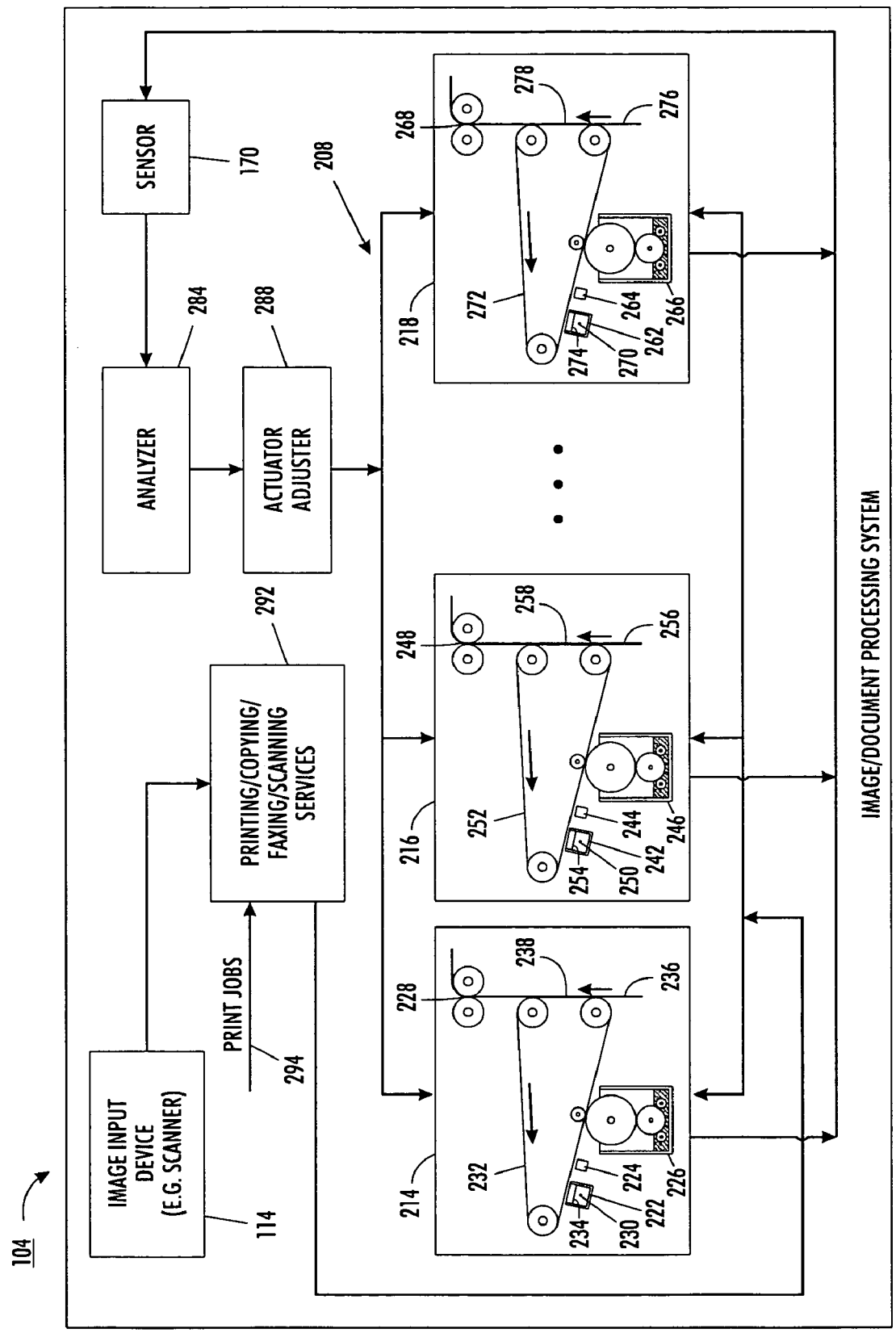
FIG. 2 is a block diagram of the document processing system including a plurality of print engines.

With continuing reference to FIG. 1 and further reference to FIG. 2, the image or document processing system 104 includes a plurality of print or marking engines, each of which is associated with a respective output terminal. For example, the plurality of marking or print engines includes first, second, . . . , $n^{th}$ xerographic marking or print engines 214, 216, . . . , 218. For simplicity, the xerographic marking engines 214, 216, . . . , 218 are illustrated as monochrome (e.g., black and white) marking engines. However, other embodiments including color marking engines are also contemplated. Furthermore, embodiments including marking engines of other technologies are also contemplated.

Each marking technology is associated with marking technology actuators. For example, the first xerographic marking engine 218 includes a charging element 222, a writing element 224, a developer 226 and a fuser 228, which each can be associated with one or more xerographic actuators.

For instance, the charging element 222 may be a corotron, a scorotron, or a dicorotron. In each of these devices, a voltage is applied to a coronode (wire or pins) 230 to ionize surrounding air molecules, which in turn causes a charge to be applied to a photoconductive belt 232 or drum. Where the charging element 222 is a scorotron, the scorotron includes a grid 234, to which a grid voltage is applied. The scorotron grid 234 is located between the coronode 230 and the photoconductor 232 and helps to control the charge strength and uniformity of the charge applied to the photoconductor 232. The coronode voltage and the grid voltage are xerographic actuators. Changing either voltage may result in a change in the charge applied to the photoconductor 232, which in turn may affect an amount of toner attracted to the photoconductor 232 and therefore the lightness or darkness of a printed or rendered image. Many xerographic marking engines include one or more electrostatic volt meters (ESV) for measuring the charge applied to the photoconductor 232. In such systems, a control loop receives information from the ESV and adjusts one or both of the coronode voltage and the grid voltage in order to maintain a desired ESV measurement.

In one embodiment, the writing element 224 is a raster output scanner (ROS). Typically, a raster output scanner includes a laser, and a polygonal arrangement of mirrors, which is driven by a motor to rotate. A beam of light from the laser is aimed at the mirrors. As the arrangement of mirrors rotates, a reflected beam scans across a surface of the photoconductor 232. The beam is modulated on and off. As a result, portions of the photoconductor 232 are discharged. Alternatively, the ROS includes one or more light emitting diodes (LEDs). For instance, an array of LEDs may be positioned over respective portions of the photoconductor 232. Lighting an LED tends to discharge the photoconductor at positions associated with the lit LED. ROS exposure is a xerographic actuator. For example, the exposure, or amount of light that reaches the photoconductor 232, is a function of ROS power and/or ROS exposure time. The higher the laser or LED power, the more discharged associated portions of the photoconductor 232 become. Alternatively, the longer a particular portion of the photoconductor 232 is exposed to laser or LED light, the more discharged the portion becomes. The degree, to which the portions of the photoconductor 232 are charged or discharged, affects the amount of toner that is attracted to the photoconductor 232. Adjusting ROS exposure adjusts the lightness of a rendered or printed image.

The developer 226 includes a reservoir of toner. The concentration of toner in the reservoir has an effect on the amount of toner attracted to charge portions of the photoconductor 232. For instance, the higher the concentration of toner in the reservoir, the more toner is attracted to portions of the photoconductor 232. E.g., toner concentration in the reservoir is a xerographic actuator. Toner concentration can be controlled by controlling the rate at which toner from a toner supply is delivered to the developer toner reservoir.

With continuing reference to FIG. 2, print media, such as sheets of paper or velum, is transported on a media transport 236, while toner on the photoconductor 232 is transferred to the media at a transfer point 238. The print media is transported to the fuser 228 where elevated temperatures and pressures operate to fuse the toner to the print media. Pressures and temperatures of the fuser 228 are xerographic actuators.

Other xerographic actuators are also known. Additionally, other printing technologies include actuators that can be adjusted to control the lightness or darkness of the printed or rendered image. For example, in ink jet based marking engines, a drop ejection voltage controls an amount of ink propelled toward print media with each writing pulse. Therefore, drop ejection voltage is a factor in an ink jet actuator.

The second and $n^{th}$ xerographic print engines 216, . . . , 218 include elements similar to the first xerographic marking engine 214 such as a charging element 242, 262, a writing element 244, 264, a developer 246, 266, a fuser 248, 268, a coronode 250, 270 and a photoconductor 252, 272. The charging element may include a charging grid 254, 274. A media transport 256, 276 carries print media to a transfer point 258, 278 and to the fuser 248, 268.

The document or image processing system 104 also includes an analyzer 284 and an actuator adjuster 288. The system 104 may also include one or more of printing, copying, faxing and scanning services 292. In one embodiment, the analyzer 284 and actuator adjuster 288 are embodied in software which is run by a controller (not shown). Alternatively, one or more of the analyzer 284, and actuator adjuster 288 are implemented in hardware, which is supervised by the controller (not shown).

The analyzer 284, actuator adjuster 288, and two or more of the plurality of print or marking engines 214, 216, . . . , 218, cooperate to perform one or more methods which control image consistency.

Figure 3A:
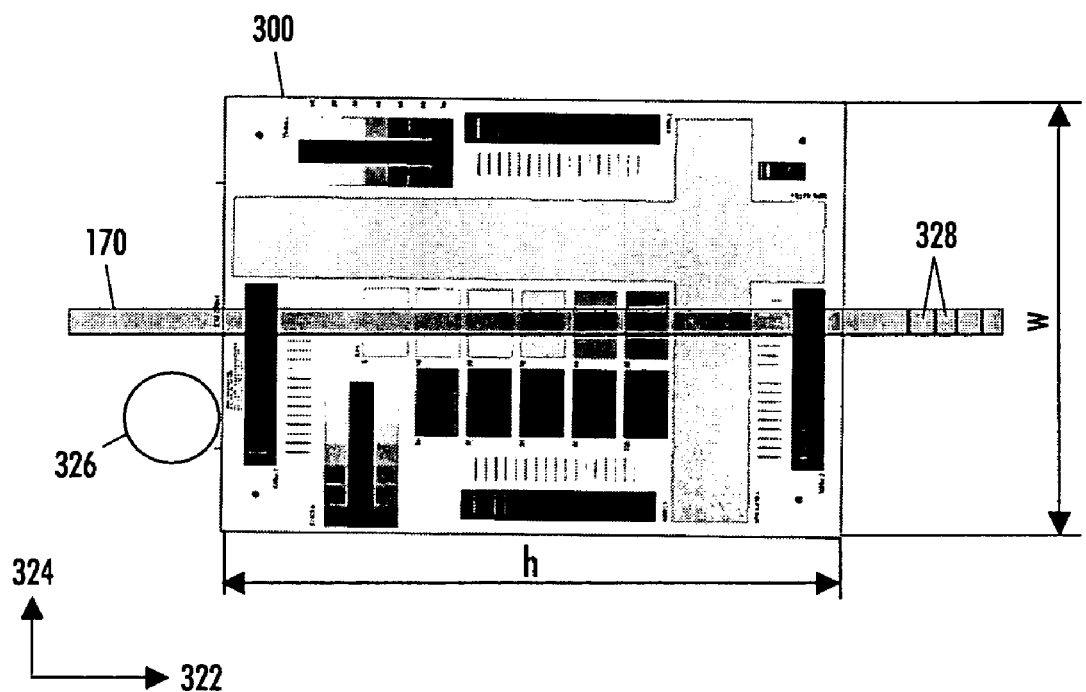
FIG. 3A is an image representation of a first image printed with a first engine and measured by a sensor.
Figure 3B:
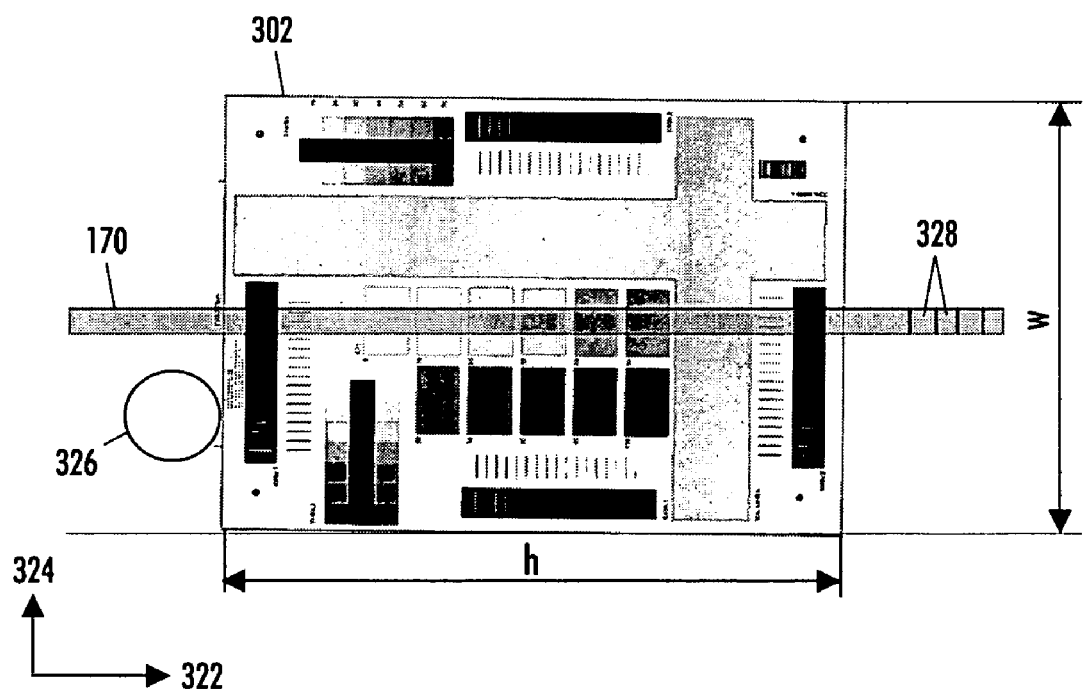
FIG. 3B is an image representation of a second image printed with a second engine and measured with the sensor of FIG. 3A.

With continuing reference to FIG. 2 and further reference to FIGS. 3A and 3B, the printed sheets or pages or images 300, 302 from each of the plurality of print engines 214, 216, . . . , 218 are delivered automatically to the sensor 170 which operates to generate a computer readable representation of the printed image which is analyzed by the analyzer 284. The analyzer 284 determines an amount by which at least one xerographic actuator should be adjusted based on the analysis. The actuator adjuster 288 adjusts the at least one xerographic actuator according to the amount determined by the analyzer 284. The analyzer 284 and actuator adjuster 288 are included as a means for controlling or adjusting image quality in the print job production so that the density of portions of the print job printed with the first engine 214 substantially matches the density of portions of the print job printed with other engines 216, . . . , 218.

Figure 4:
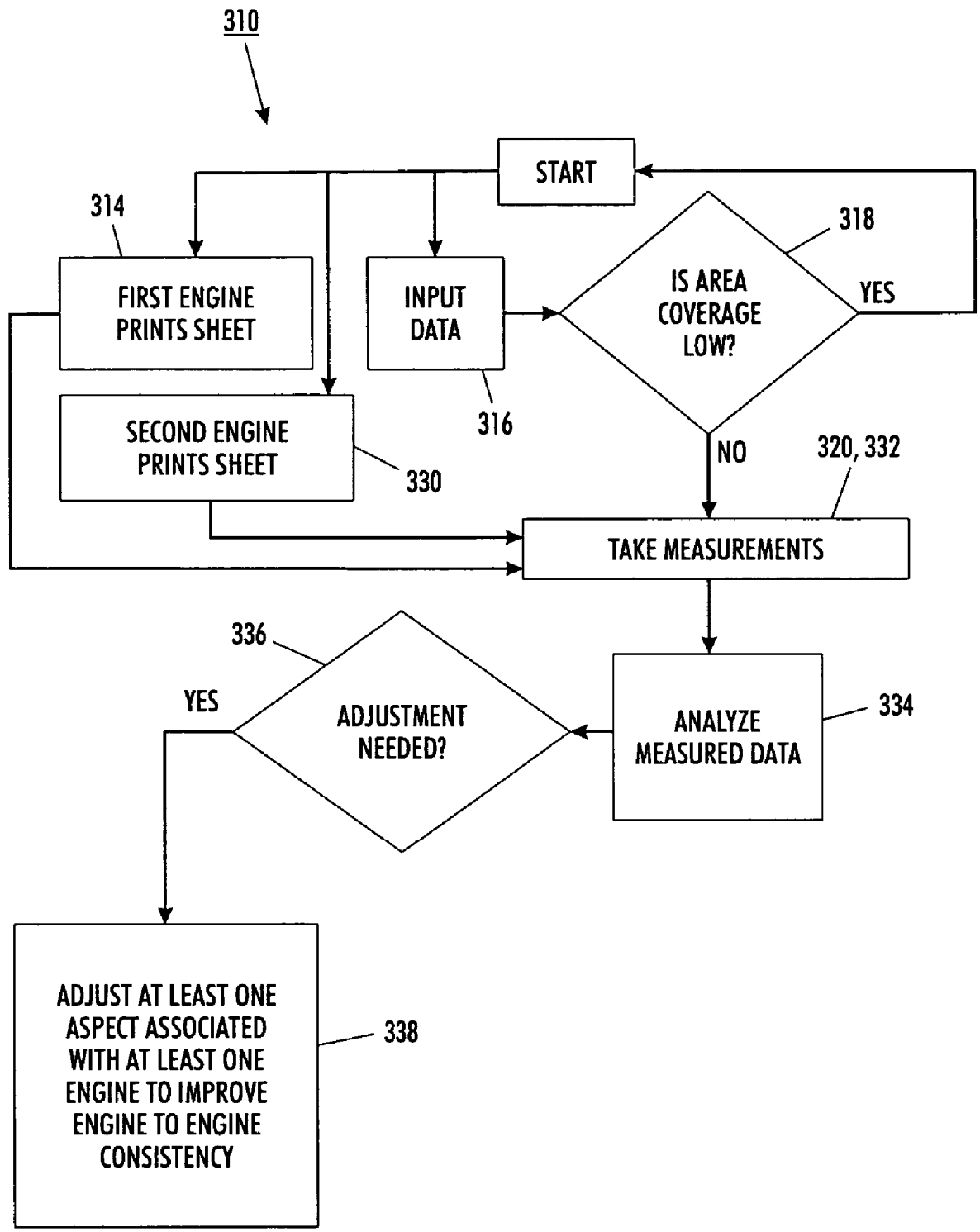
FIG. 4 is a flow chart outlining a method to control image consistency of the multiple marking engines.

With continuing reference to FIGS. 3A and 3B and further reference to FIG. 4, a method 310 controls image consistency in the image processing system 104 that includes the marking engines 214, 216. Although illustrated with reference to only two print engines, it is contemplated that the control method 310 is applicable to printing systems which include more than two print engines. Integration of the sensor 170 within the media path 136, 142 allows utilizing the method 310 with any configuration of the multiple engine document system 104. A first sheet or image 300 is printed 314 with the first marking engine 214 to generate a first rendered version of the first sheet. In one embodiment, the control method 310 is restricted to a certain area coverage to minimize interference of measurement noise. More specifically, from available input data 316, the analyzer 284 determines 318 whether the area coverage of the image 300 is greater than a predetermined area coverage threshold value. For example, if the input area coverage is less than about 5% -10%, no measurements are taken and no adjustments to the engines are to be made. Such restriction of the area coverage ensures a robust estimate of the differences between the engines in terms of detecting lightness, darkness, and the like. If it is determined that the area coverage is greater than the predetermined area coverage threshold, the sensor 170 measures 320 light reflected by each pixel in a cross section direction 322 of each line of the image 300 in a process direction 324. Since the measurement takes place on the fly, a clocking mechanism 326 is implemented. For example, the clocking mechanism can be a timer which signals the sensor 170 to take measurements, for example, every 0.1 seconds. Of course, it is contemplated the setting of such timer can be varied to accommodate various printer or production needs. As another example, a timing wheel can be implemented which provides a hardwired clock to the sensor 170 to take measurements. Of course, it is contemplated that other timing mechanisms can be implemented. The sensor 170 is the full width array sensor, $n \times M$, where n is a number of sensing elements 328 in the process direction 324, and M is a number of sensing elements 328 in the cross process direction 322. For example, the number of elements in the process direction 324 can be 1, while the number of sensing elements in the cross process direction 322 can be equal to a number of cross process direction pixels of the given printer. Such sensor is a line sensor, or $1 \times M$ sensor. However, other arrangements of the sensing elements 328 of the sensor 170 are also contemplated. A second sheet or image 302 is printed 330 with the second marking engine 216 to generate the second rendered version of the second sheet, which is measured 332 by the sensor 170. The data of the first and second sheets 300, 302 are analyzed 334. Based on the analysis, if it is determined that an adjustment is needed, at least one aspect associated with at least one of the marking engines 214, 216 is adjusted 338 in a manner predetermined to improve engine to engine consistency.

In this manner, each image is measured as the sheets, which are printed by different engines, are transferred through the sensor 170. As one example, the method 310 can be effectuated when the print engines 214, 216 print the same image. As another example, the method 310 can be effectuated when the input area coverage of the engines 214, 216 is the same, but the output area coverage does not match. Because the control method 310 automatically adjusts the printers based on the measured printed images, no special scheduling of test patches is needed, which minimizes production downtime, customer intervention and waste of sheets. The calculations of adjustments are made after the measurements are averaged over many prints, thus filtering noise and providing robust estimates before adjustments.

Figure 5:
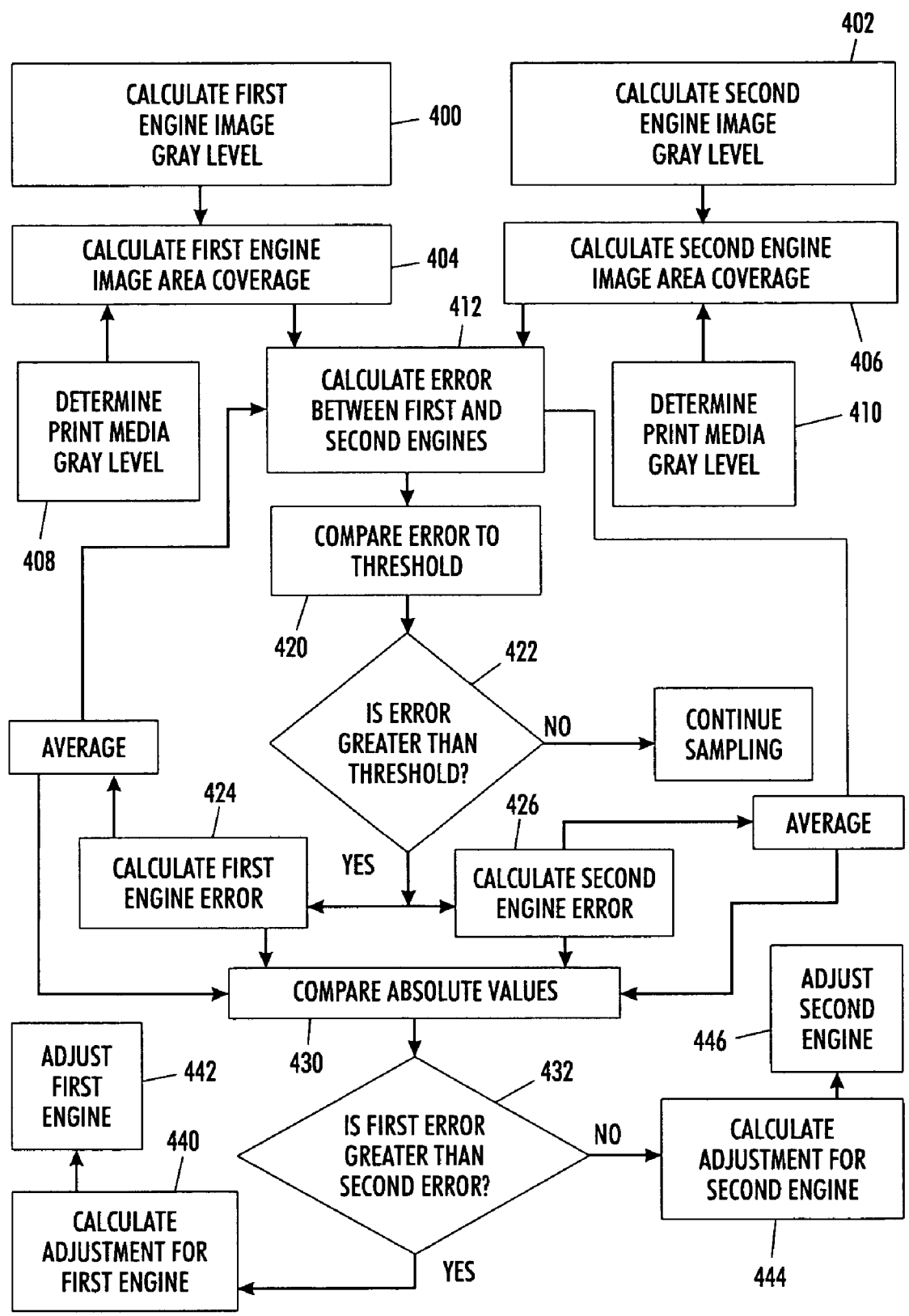
FIG. 5 is a more detailed flow chart for a method of FIG. 4.

With continuing reference to FIGS. 3A, 3B and 4 and further reference to FIG. 5, analyzing 334 the first and second images 300, 302 can include any analysis appropriate to measure image and the aspect or aspects of marking engine processes that are being studied, analyzed, adjusted or compensated for.

In one embodiment, average gray level values over the respective first and second sheets 300, 302 are determined 400, 402 according to equation:

$$GL_{meas} = \frac{\sum_{j=0}^{N-1}\sum_{i=0}^{M-1} GL_{ij}}{M*N}, \qquad (1)$$

where $GL_{meas}$ is the average gray level value over the respective image 300, 302;

M is a number of pixels in the cross-process direction 322 and is equal to $R_x*h$;

N is a number of scan lines in the process direction 324 and is equal to $R_y*w$;

$R_x$ is a resolution of the printbar in the cross-process direction 322;

$R_y$ is a resolution of the printbar in the process direction 324;

h is a height of the sheet 300, 302; and w is a width of the sheet 300, 302.

First and second area coverages $AC_{meas}(A)$, $AC_{meas}(B)$ of the first and second sheets 300, 302 are determined 404, 406 according to equation:

$$AC_{meas} = GL_{meas}/GL_{white} \qquad (2)$$

where $AC_{meas}$ is the measured output area coverage of each marking engine 214 216; and $GL_{white}$ is a gray level of print media.

The gray level value of the print media is preferably a known value which can be determined in advance. Optionally, as the gray level value might change from one stack of print media to another, the gray level value of the print media is determined 408, 410 by measuring the average gray level of the blank sheet in accordance with the Equation (1). Such measurement, for example, can take place by internally scheduling to process a blank sheet periodically.

An error between the first and second area coverages ERR(AB) is determined 412 according to equation:

$$ERR(AB) = AC_{meas}(A) - AC_{meas}(B), \qquad (3)$$

where ERR(AB) is the error between the first and second area coverages $AC_{meas}(A)$, $AC_{meas}(B)$.

The determined error ERR(AB) between the first and second engines 214, 216 is compared 420 to a prespecified threshold $E_{TH}$. If the determined error ERR(AB) is greater 422 than the threshold $E_{TH}$, errors of the first and second engines ERR(A), ERR(B) are determined 424, 426.

The error of the first engine ERR(A) is determined 424 according to equation:

$$ERR(A) = AC_{meas}(A) - (AC_{IN(A)} + C), \qquad (4)$$

where AC(IMAGE) is the input area coverage; and

C is a constant representative of the system growth.

The error of the second engine ERR(B) is determined 426 according to equation:

$$ERR(B) = AC_{meas}(B) - (AC_{IN(B)} + C), \qquad (5)$$

where AC(IMAGE) is the input area coverage; and

C is a constant representative of the system growth.

In a perfectly calibrated system, the area coverage of the output perfectly matches the area coverage of the input. As in reality the systems are not perfectly calibrated, the area coverage of the output rarely perfectly matches the area coverage of the input. The constant C is added to the area coverage of the input in the Equation (5) to prevent the system shrinkage and possible loss of information.

An absolute value of the error of the first engine ERR(A) is compared 430 to the absolute value of the error of the second engine ERR(B). If the absolute value of the error of the first engine ERR(A) is greater 432 than the absolute value of the error of the second engine ERR(B), then an adjustment of an exposure EXP(A) of the first engine 214 is calculated 440 as a function of the determined error ERR(A) according to equation:

$$EXP(A) = EXP_0(A) + ERR(A)*sE, \qquad (6)$$

where EXP(A) is the adjustment of the exposure of the first engine 214;

$EXP_0(A)$ is the current setting of the exposure of the first engine 214;

ERR(A) is the relative error of the first engine 214; and sE is the exposure sensitivity.

The first engine 214 is adjusted 442 by the calculated adjustment EXP(A).

If the absolute value of the error of the second engine ERR(B) is greater than the absolute value of the error of the first engine ERR(A), then an exposure EXP(B) of the second engine 216 is calculated 444 as a function of the determined error ERR(B) according to equation:

$$EXP(B) = EXP_0(B) + ERR(B)*sE, \qquad (7)$$

where EXP(B) is the adjustment of the exposure of the second engine 216;

$EXP_0(B)$ is the current setting of the exposure of the second engine 216;

ERR(B) is the relative error of the second engine 216; and sE is the exposure sensitivity.

The second engine 216 is adjusted 446 by the calculated adjustment EXP(B).

In this manner, the determined new exposure drives the first marking engine and the second marking engine toward each other. As a result, image consistency is substantially improved between prints rendered or printed with different marking engines 214, 216.

Although the discussion above concerns only two print engines, the control method 310 is applicable to the printing system which includes more than two print engines. In such system, the engine having the largest error is adjusted to closer match the xerography of other engines.

In one embodiment, the statistical performance of each engine is gathered overtime. For example, the engine errors ERR(A), ERR(B) are accumulated for the respective engines 214, 216 and averaged in a predetermined manner. The error between the engines is determined as $$ERR'(AB) = ERR'(A) - ERR'(B), \text{ where}$$

ERR'(AB) is an averaged error between the averaged first and second engines errors ERR'(A), ERR'(B).

The averaged error ERR'(AB) is compared to the predetermined threshold $T_{TH}$. If the averaged error ERR'(AB) is greater than the threshold $T_{TH}$, the appropriate adjustments are calculated and applied in the manner discussed above. When the engine's change is slow, with variation occurring in several 10,000 prints per L* unit, such control mechanism provides a robust statistical estimate prior to actuation of a given xerographic parameter such as exposure. The engines are kept consistent over time.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An automatic method for controlling image consistency in an image rendering system that includes marking engines, the method comprising:
   analyzing input data for a print job, comprising:
      determining a first input area coverage for a first sheet to be printed with a first marking engine; and
      determining a second input area coverage for a second sheet to be printed with a second marking engine;
   comparing the first and second input area coverages to a prespecified area coverage threshold;
   printing the first sheet of the print job on a first print media with the first marking engine;
   printing the second sheet of the print job on a second print media with the second marking engine;
   if both first and second coverage areas were greater than the prespecified area coverage threshold in conjunction with the comparing:
      measuring light reflected from the first sheet to produce first print density data associated with the first marking engine and light reflected from the second sheet to produce second print density data associated with the second marking engine;
      identifying a density inconsistency between the first and second marking engines by calculating a first average gray level for the first sheet based at least in part on the first print density data, calculating a second average gray level for the second sheet based at least in part on the second print density data, and determining a first relative density error for the first marking engine and a second relative density error for the second marking engine based at least in part on the corresponding first and second average gray levels; and
      adjusting at least one parameter of at least one of the first and the second marking engine to improve image consistency between the first and second marking engines based at least in part on the corresponding first and second relative density error.

2. The method of claim 1, wherein the measuring includes: measuring light reflected from each pixel of each line of the first and second sheets with a sensor.

3. The method of claim 2, wherein the sensor is a full width array sensor.

4. The method of claim 1, wherein identifying the density inconsistency further includes:
   determining a first output area coverage of the first sheet;
   determining a second output area coverage of the second sheet; and
   calculating a difference in the first and second output area coverage according to equation:

$ERR(AB)=AC_{meas}(A)-AC_{meas}(B)$, where

ERR(AB) is an error between the first and second output area coverages;
$AC_{meas}(A)$ is the determined first output area coverage; and
$AC_{meas}(B)$ is the determined second output area coverage.

5. The method of claim 4, wherein identifying the density inconsistency further includes:
   comparing the calculated error to a prespecified threshold; and
   wherein adjusting the at least one parameter is based at least in part on the comparison.

6. The method of claim 5, further including:
   calculating the first and second relative density errors of the first marking engine and the second marking engine;
   comparing an absolute value of the first relative density error of the first marking engine to an absolute value of the second relative density error of the second marking engine;
   based on the comparison, calculating an amount of adjustment of the at least one parameter of the marking engine with a larger absolute value of the relative density error; and
   adjusting the at least one parameter of the marking engine which has the larger absolute value of the relative density error.

7. The method of claim 1, wherein identifying the density inconsistency further includes:
   identifying first and second media gray level values based at least in part on selection of the respective first and second print media; and
   dividing the first average gray level value by the first media gray level value to produce a first output area coverage for the first sheet and the second average gray level value by the second media gray level to produce a second output area coverage for the second sheet.

8. The method of claim 1, wherein identifying the density inconsistency includes:
   comparing an aspect of the first sheet and a similar aspect of the second sheet to each other; and
   determining a difference between the aspect of the first sheet and the aspect of the second sheet.

9. A document processing system comprising:
   two or more xerographic print engines for printing sheets of a print job, each xerographic print engine having at least one xerographic actuator;
   a sensor for measuring light reflected from each sheet of the print job printed with the xerographic print engines to produce print density data associated with each xerographic print engine;
   an analyzer for determining an input area coverage of each sheet of the print job by analyzing input data for the corresponding sheet, comparing each input coverage area to a prespecified area coverage threshold, and, if the input coverage area is greater than the prespecified area coverage threshold in conjunction with the comparing, analyzing the print density data associated with the sheets printed with different engines, calculating average gray levels for each sheet based at least in part on the print density data for the corresponding sheet, determining a relative density error for each xerographic print engine based at least in part on corresponding average gray levels, and determining an amount of adjustment of at least one parameter associated with at least one xerographic actuator for at least the xerographic print engine with a larger absolute value of the relative density error than other xerographic print engines; and
   a xerographic actuator adjuster for adjusting the at least one xerographic actuator according to the adjustment amount determined by the analyzer to substantially match the xerography of the xerographic print engines.

10. The document processing system of claim 9, wherein the sensor is a full width array sensor.

11. The document processing system of claim 9, wherein the analyzer further includes:
an area coverage calculating processor for determining at least a first output area coverage of a first sheet printed by a first xerographic print engine and a second output area coverage of a second sheet printed with a second xerographic print engine and calculating a difference in the first and second output area coverage.

12. The document processing system of claim 11, wherein the analyzer further includes:
a comparator for comparing the calculated difference to a prespecified threshold, and wherein the xerographic actuator adjuster adjusts at least one of the first and second xerographic print engine based at least in part on the comparison.

13. The document processing system of claim 9, wherein the analyzer further includes:
an engine error calculator which calculates first and second relative density errors of first and second xerographic print engines and compares an absolute value of the first relative density error of the first xerographic print engine to an absolute value of the second relative density error of the second xerographic print engine; and
an adjustment calculating processor which, based on the comparison, calculates an amount of adjustment of the at least one parameter associated with at least one xerographic actuator for at least the xerographic print engine which has a larger absolute value of the relative density error than other xerographic print engines.

14. The document processing system of claim 9, wherein the at least one parameter is a set point of an exposure, which is calculated according to one of:

$$EXP(A) = EXP_0(A) + ERR(A)*sE, \text{ if the absolute value of the first relative density error is larger and}$$

$$EXP(B) = EXP_0(B) + ERR(B)*sE \text{ if the absolute value of the second relative density error is larger,}$$

where
$EXP(A)$ is the adjustment amount of the exposure of the first xerographic print engine;
$EXP(B)$ is the adjustment amount of the exposure of the second xerographic print engine;
$EXP_0(A)$ is an initial exposure setting of the first xerographic print engine;
$EXP_0(B)$ is an initial exposure setting of the second xerographic print engine;
$ERR(A)$ is the first relative density error;
$ERR(B)$ is the second relative density error; and
$sE$ is the exposure sensitivity.

15. An automatic method for controlling image consistency in a printing system that includes a plurality of print engines, the method comprising:
analyzing input data for input sheets of a print job to determine an input area coverage for at least one input sheet of each print engine of a plurality of print engines with which the print job is to be printed;
printing the print job on paper with multiple print engines of the plurality of print engines;
measuring reflected light from printed sheets of the print job to produce print density data for at least one printed sheet associated with each print engine with which the print job was printed, wherein the printed sheets for which print density data is produced correspond to the input sheets for which input area coverage was determined;
calculating average gray levels for at least one printed sheet associated with each print engine with which the print job was printed based at least in part on the corresponding print density data;
determining relative density errors for at least one printed sheet associated with each print engine with which the print job was printed based at least in part on the corresponding average gray levels and the corresponding input area coverages;
comparing absolute values of the relative density errors to determine which corresponding print engine has the largest relative density error,
calculating an amount of adjustment of a parameter of at least the print engine with the largest error based at least in part on the determined relative density error for the corresponding print engine; and
adjusting the parameter of each print engine for which the amount of adjustment was calculated to improve the image consistency in the print job.

16. The method of claim 15, wherein the measuring includes:
measuring an output area coverage of each printed sheet from which reflected light is measured with a sensor.

17. The method of claim 16, wherein the determining includes:
calculating the relative density error based at least in part on a difference between the input area coverage of the corresponding input sheet and the output area coverage of the corresponding printed sheet.

18. The method of claim 17, further including:
averaging the relative density error for each print engine with which the print job was printed over a prespecified number of printed sheets; and
calculating a print engine-to-print engine relative density error for each pair of print engines with which the print job was printed based at least in part a difference between the averaged relative density errors of the respective print engines of the corresponding pair.

19. The method of claim 18, further including:
comparing each print engine-to-print engine relative density error to a prespecified threshold;
based on the comparison, initiating calculation of the amount of adjustment of the parameter for at least the print engine with the largest average relative density error; and
adjusting the parameter of at least the print engine with the largest average relative density error.

* * * * *